United States Patent [19]

Mätzold et al.

[11] Patent Number: 4,476,577

[45] Date of Patent: Oct. 9, 1984

[54] RADIO TRANSMITTER SYSTEM WITH SPECIAL PROGRAM IDENTIFICATION

[75] Inventors: Uwe Mätzold, Salzgitter; Dieter Heiss, Hildesheim, both of Fed. Rep. of Germany

[73] Assignee: Blaupunkt Werke GmbH, Hildesheim, Fed. Rep. of Germany

[21] Appl. No.: 415,443

[22] Filed: Sep. 7, 1982

[30] Foreign Application Priority Data

Nov. 12, 1981 [DE] Fed. Rep. of Germany ....... 3144943

[51] Int. Cl.[3] .............................................. H04B 1/04

[52] U.S. Cl. ...................................... 455/102; 455/45; 455/108; 332/17; 332/22; 370/11

[58] Field of Search ......................... 455/45, 102, 108; 381/4, 14; 370/11; 375/59; 332/17, 21, 22, 31 R, 38, 40, 41

[56] References Cited

U.S. PATENT DOCUMENTS 3,497,625 2/1970 Hileman et al. ...................... 332/22

3,732,507 5/1973 Christiansen et al. ................ 332/17

4,003,003 1/1977 Heaberlin ............................. 332/17

*Primary Examiner*—Marc E. Bookbinder

*Attorney, Agent, or Firm*—Frishauf, Holtz, Goodman & Woodward

[57] ABSTRACT

To permit mass-production of coders selectively usable in various types of transmitter installations, and regardless of whether designed for stereophonic or monophonic transmission, in which a subcarrier of non-audible frequency (57 kHz) is radiated, amplitude modulated by separate recognition signals characterizing intelligence information (AR, or announcement recognition) and a specific transmitter (region or radio station recognition, RR), a memory element (36) such as a PROM is provided, connected to a selector switch, the memory element having stored therein data representative of (1) frequency of amplitude modulation of the subcarrier of the announcement recognition (AR) signal;

(2) frequency of amplitude modulation of the radio station recognition (RR) signal;

(3) degree of modulation by the (AR) signal;

(4) degree of modulation by the (RR) signal, and, preferably, data to provide a visual indication of a respective frequency channel and modulation degree, the memory element (36) being programmed for selective control of a frequency divider chain (31,32,33,34) including a programmable divider (30) as controlled by the selector switch. The degree of modulation of the subcarrier as between the respective AR and RR frequencies can be changed in dependence on whether only the RR modulation signal is present, or the AR and the RR signals are both present.

9 Claims, 4 Drawing Figures

RADIO TRANSMITTER SYSTEM WITH SPECIAL PROGRAM IDENTIFICATION

Reference to Related Patent and Applications Assigned to the Assignee of this application and incorporated herein by reference:

U.S. Pat. No. 3,949,401: Hegeler et al, issued Apr. 6, 1976, U.S. Pat. No. 4,083,008, Eschke, issued Apr. 4, 1978, U.S. Ser. No. 06/319,653, filed Nov. 9, 1981, Eilers and Bragas, "Communication System and Transmitter Therefor, Including Special Announcement Recognition", U.S. Ser. No. 06/319,654, filed Nov. 9, 1981, Eilers and Bragas, "FM Receiver for General Programs and Special Announcements", U.S. Ser. No. 06/319,655, filed Nov. 9, 1981, Eilers and Bragas, "FM Receiver for Reception of Special Announcements and General Programs".

The present invention relates to a radio transmitter system, and more particularly to a system in which program information is radiated and, in addition, a subcarrier is provided which is amplitude modulated with one, or two recognition frequencies to characterize special transmissions, one characterizing a particular radio station, or region, hereinafter the RR signal, and another that a special program content, for example an announcement is being radiated, hereinafter the AR signal.

BACKGROUND

It has been proposed—see the referenced Hegeler, U.S. Pat. No. 3,949,401—to radiate with FM transmitters various announcements, for example traffic announcements or the like. Transmitters which are capable of radiating such announcements utilize an auxiliary carrier besides the program modulation. In accordance with one proposal, the auxiliary carrier is radiated at a frequency of 57 kHz which, in FM stereo transmitters, is derived as the third multiple of the 19 kHz stereo pilot tone. It is radiated in synchronism therewith. The 57 kHz subcarrier is phase-locked with the 19 kHz pilot tone, the zero crossings of the two frequencies occurring at the same time. The auxiliary 57 kHz subcarrier is utilized to transmit additional information, hereinafter recognition information, which is applied to the auxiliary carrier in form of amplitude modulation. The overall system is described in the above-identified Hegeler patent, and in the referenced Eilers and Bragas applications.

One of the recognition frequencies is radiated together with the intelligence transmission on the main carrier frequency. This recognition frequency thus indicates that, during its radiation by the FM transmitter, the FM transmitter provides program information of the specific announcement, for example a traffic announcement, sports report, or the like, and the recognition frequency which recognizes the announcement is referred to as the AR frequency. The AR frequency, in accordance with the proposed system, is placed within a very narrow frequency band, in the range, for example, of between 100 to 200 Hz, for example 125 Hz, and modulated on the auxiliary carrier in the form of amplitude modulation.

Receivers which are designed to recognize the AR frequency have a 57 kHz detector and an amplitude demodulator, which is coupled to a switching circuit controlling the audio frequency stage thereof. The control may be used to raise the volume during the announcement, or to provide audio output if the receiver is muted, for example by inhibiting a muting circuit; in combined radio cassette or cartridge recorder-transducer systems, the switching can also be used to transfer reproduction from the cassette or cartridge to the receiver for transmission of the announcement, for example a traffic or emergency announcement, when the announcement starts, and to revert the reproduction by the receiver to cassette or cartridge reproduction after termination of the announcement. Other switching functions can also be controlled thereby.

The auxiliary carrier also radiates recognition frequencies which characterize specific radio stations, or geographical regions. Various transmiters capable of radiating announcements have assigned thereto radio station or region recognition frequencies (RR). If the stations are within a certain region, they may all have the same radio station recognition frequency, that is, the RR frequency assigned thereto, since traffice announcements may relate, essentially, to the same geographic region. The amplitude of the auxiliary carrier is continuously modulated with the respective RR frequency assigned to the station. The bandwidths of the respective RR frequencies, and the relationship with respect to each other of different frequencies are so selected that, with a quality of 20, an adjacent channel damping of more than 15 db is obtained. Various RR frequencies are possible within the available frequency band; the frequencies are so selected that the harmonics of the respective assigned frequencies are far between other assigned frequencies.

During an announcement, the auxiliary 57 kHz subcarrier is thus modulated by two recognition signals: the AR signal to indicate that an announcement is being radiated, and the radio station or region RR signal indicating the particular station. If no announcement is being radiated, the auxiliary subcarrier is modulated only with the RR signal to indicate, upon tuning of a receiver, that the particular station may provide announcements.

Various radio transmitter stations utilize coders which control modulation of a subcarrier with the respective RR and AR signals. The coders, in the past, have been matched to the particular type of transmitter. The respective AR frequencies, and the RR frequencies, can be selected in accordance with governmental or national standards.

Stereo FM transmitters and monophonic FM transmitters usually use different systems to generate an auxiliary carrier. Further, it is desirable that the degree of modulation of the auxiliary carrier, due to the AR signal and to the RR signal, should be different. If individual coders have to be designed and provided for respective transmitters, so that they are specially matched to the transmitter, the cost of the coder will become substantial. This is particularly important if a large number of comparatively low-power transmitters desire installation of the respective coders, since the cost of the coders may become a substantial fraction of overall station costs.

THE INVENTION

It is an object to provide a coder which is essentially universally applicable and preprogrammable, so that matching to a particular station can be effected inexpensively, so that the general coder structure can be mass-produced, and hence provided at low cost.

Briefly, a memory element is provided which stores data therein representative of (1) the degree of amplitude modulation of the subcarrier characterizing the intelligence information being radiated, for example that an announcement is being radiated or, in other words, that an AR signal is being transmitted;

(2) the degree of amplitude modulation of the subcarrier characterizing information specific to the transmitter, that is, the particular RR signal;

(3) the frequency of the amplitude modulation of the AR signal;

(4) the frequency of modulation of the RR signal.

Desirably, the memory further includes data to provide signals controlling a display, or an indicator, so that the station operator will know, at a glance, what is being radiated.

The system has the advantage that coders can be made in mass-production, and by mere change of the contents of a memory, typically a programmable read-only memory (PROM), the output of the coder can be matched to the specific requirements of the station. No additional adjustment or calibration on the transmitter itself is needed. Mass-production of the coder thus permits realization of the economies of quantity production of a single unit; mere reprogramming of a PROM, or reconnection of the one or the other element is all that is necessary to match the coder to a specific transmitter. It is not necessary to provide separate coders for stereo transmitters or monophonic transmitters.

In accordance with the feature of the invention, an output low-pass filter is provided for the RR recognition signals. Such a filter is preferably a switchable filter, so that it can be switched in dependence on the RR frequency associated with a particular transmitter, and generated in response to a suitable command from the PROM. The frequency range of possible RR signals can be substantial. Thus, by providing a switchable output low-pass filter, the output can readily be matched to the specific radio station or region.

DRAWINGS

Figure 1:
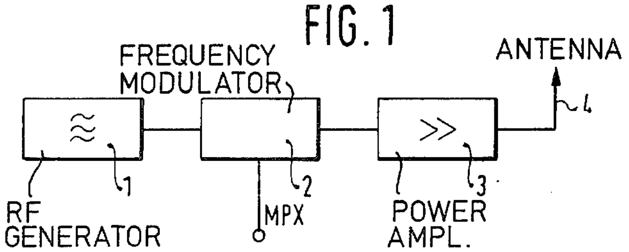
FIG. 1 is a schematic representation of the major components of an FM transmitter.

A typical FM transmitter is shown in FIG. 1, in which a RF generator 1 generates the carrier frequency, which is modulated by a frequency modulator 2 with a broadband intelligence modulation MPX. The modulated carrier is amplified in a power amplifier 3 and radiated by an antenna 4.

If the transmitter is to be capable of also radiating announcements, for example traffic announcements, warning and safety announcements, or the like, the modulation MPX includes a 57 kHz subcarrier which is amplitude modulated with the respective recognition frequencies. If the transmitter is a stereo transmitter, an additional 19 kHz stereo pilot subcarrier is also frequency modulated on the signal derived from RF generator 1. The 19 kHz stereo pilot tone is phase-locked to the 57 kHz subcarrier, with synchronized zero-passage in the same direction. All the signals are applied to the input terminal MPX.

Figure 2:
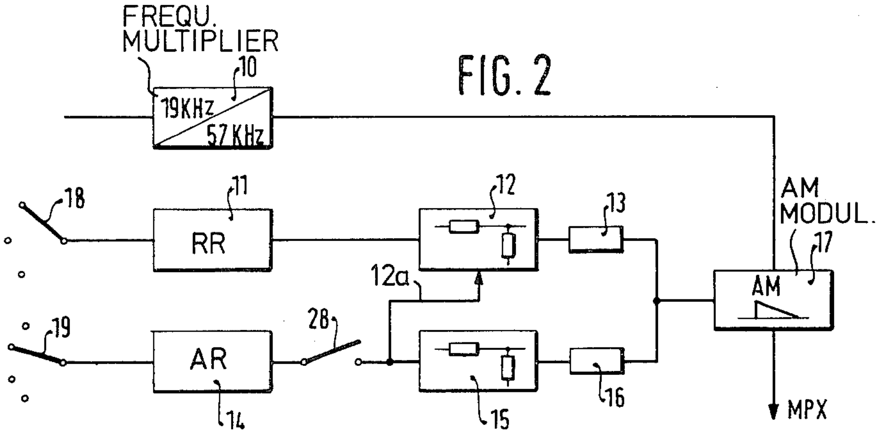
FIG. 2 is a block diagram of a coder to generate an auxiliary carrier and the radio station or region (RR) signal, and the announcement recognition (AR) signal.

FIG. 2 illustrates generation of the subcarrier and the recognition frequencies. A frequency multiplier 10 has the 19 kHz stereo pilot tone signal applied thereto. This signal is tripled in the frequency multiplier 10, so that its output will be 57 kHz signal. The 57 kHz signal is applied to an amplitude (AM) modulator 17.

A region recognition signal generating circuit 11 is provided, the frequency of which is controllable by a switch 18. Switch 18, customarily, additionally includes an OFF switch, which disconnects the generator 11. The output is a signal having the frequency associated with a particular region or radio station recognition frequency (RR) assigned to the transmitter; it is applied to a modulation control unit 12, which controls the degree of modulation of the subcarrier derived from frequency multiplier 10, as will appear. Similarly, a AR frequency generator 14 is provided, the frequency, and operation of which is controlled by a switch 19. The output from AR generator is applied to a switch 28. Switch 28 is used to connect the AR signal if an announcement is being radiated during operation of the transmitter. Customarily, switch 28 would be remotely controlled, for example by a button from the transmitter studio, and connected during the announcement. The output from switch 28 is connected to a modulation control unit 19, which controls the degree of modulation of the 57 kHz subcarrier. If switch 28 is closed, the signal from the AR generator and also applied to the modulation control element 15, can be utilized by connection through line 12*a* to change the degree of modulation of the RR signal, for example by lowering the degree of modulation of the RR signal while the AR signal is present. Line 12*a* may, for example, include a rectifier circuit to effect switching within the modulation control unit 12. The outputs from units 12, 15 are coupled by coupling resistors 13 and 16 to the AM modulator 17.

In accordance with a system which has been proposed—see the aforementioned referenced Eilers and Bragas applications—the RR signal is provided with a modulation degree of 60% and the AR signal with a modulation degree of 30%, and so applied to the AM modulator 17. It has also been proposed to provide the AR signal with a modulation degree of 60% and to drop the RR signal from a normally present 60% modulation to 30%, provided the AR signal is present—which is indicated, for example, by energization of the output from switch 28, and available on line 12*a*. The AR signal, thus, can be used to control the degree of modulation of the RR signal. The amplitude modulated auxiliary carrier at the output of the amplitude modulator 17 is applied to the MPX input of the frequency modulator 2 (FIG. 1).

Figure 3:
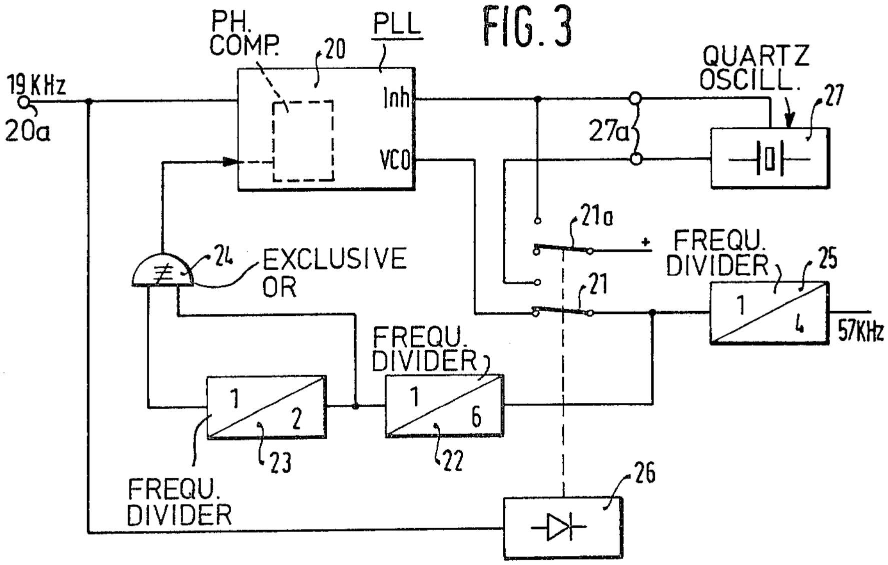
FIG. 3 is a schematic circuit diagram illustrating the generation of an auxiliary carrier.

FIG. 3 is an example of a universally suitable frequency multiplier 10, that is, a frequency multiplier which can be utilized both by stereo transmitters, as well as monophonic transmitters.

A 19 kHz signal, if used with a stereo transmitter, and available from the transmitter, is applied to the input of a phase-locked loop (PLL) circuit 20. PLL circuits are available as integrated circuits and a suitable one for purposes of the present application is, for example, MC 14046, made by Motorola. The PLL circuit has a voltage controlled oscillator (VCO) which operates at 228 kHz. The output signal of the VCO of the PLL 20 is connected to a switch 21 and, through the switch 21, when in the position shown, to a first frequency divider 25, which divides the VCO frequency by four, so that the output of the frequency divider 25 provides the 57 kHz signal.

The signal from the VCO, beyond switch 21, is also applied to a second frequency divider 22 which divides by six. The output of the frequency divider 22 is connected to one input of an exclusive-OR gate 24, and to a second frequency divider 23 which divides by two. The output of frequency divider 23 is applied to a further input of the exclusive-OR gate 24. The output of the exclusive-OR gate is connected to the second frequency input of the PLL circuit 20. The 19 kHz signal is, additionally, connected to a switching control element 26, which, preferably, includes a rectifier.

The circuit additionally includes a quartz oscillator 27, set to operate at the frequency of 228 kHz. The quartz oscillator 27 is preferably plug-connected through connecting plugs 27, since it is not needed for all applications and the expense thereof can be saved in some installations.

OPERATION

If the 19 kHz signal applied to input line **20*a* to the PLL should be missing, or fall, switch 21 will change over to the position which is not shown in FIG. 3, so that the terminals 21, 21*a* will transfer. Under these conditions, the frequency divider 25 is connected to the quartz oscillator 27 which operates on the frequency of 228 kHz, that is, the same as the VCO of the PLL. Oscillator 27 is connected only if the switch has changed over, and receives power from the switch terminal 21*a* if the switch has changed over; otherwise, oscillator 27 is not in operation. Upon change-over of the switch, terminal 21*a* thereof will also apply a voltage to the inhibit input of the PLL circuit 20**, to positively disconnect the VCO thereof.

OPERATION, CIRCUIT OF FIG. 3

The VCO is synchronized by the 19 kHz pilot tone at terminal **20*a* —if present. The circuit then operates in accordance with a well-known PLL method. If, however, the stereo pilot tone of 19 kHz should drop out, or is not present because the transmitter is a monophonic transmitter, switch 21 will change over to quartz oscillator 27. This change-over can be done manually—for example if the transmitter is a monophonic transmitter; if a stereo transmitter, the switch control element 26 causes transfer of the switch 21, 21*a* if the 19 kHz tone drops out. Thus, failure of a signal at terminal 20*a* causes the switch control element 26, for example a relay normally operated by rectified signals from terminal 20*a* to drop out, thus restoring switch 21, 21*a*** to the upper (not shown) position, for example under spring loading.

Upon drop-out of the 19 kHz pilot tone, the inhibit input of the PLL circuit is activated, so that the VCO positively is prevented from oscillating. The 57 kHz signal for the auxiliary carrier is then derived from the quartz oscillator 27. If the coder is to be installed in a transmitter which radiates stereo signals, the quartz oscillator 27 is not absolutely necessary, and can be provided as a backup. To save initial costs, the relatively expensive quartz oscillator 27 thus can be left off. Plug-in terminals **27*a* are preferably provided on the actual circuit structure, to permit ready addition of the quartz oscillator 27, if desired. The switch control element 26, then, must then be locked into the switching position shown. This can readily be accomplished by adding a further connecting terminal link coupled to the plug-in connector 27*a***.

If, in a stereo transmitter and with a quartz oscillator 27 removed, the 19 kHz tone should fail, for example, due to failure in the circuitry of the transmitter, then the divider 23 and the exclusive-OR gate 24 provide for at least short-term maintenance of the frequency of the PLL circuit. By use of a phase comparator, which is present in most of the PLL integrated circuit components, which requires supply of two signals offset by 90°, the VCO control voltage will be dropped to half the operating voltage upon failure of the 19 kHz signal. If the VCO is synchronized, its frequency then will not change since the control voltage will also have half the supply level. The requisite control voltage, shifted by 90°, is obtained by the divider 23 and the exclusive-OR gate 24. If phase-synchronized input signals for the PLL would be required, then the output control voltage would approach a limit value and thus detune the frequency of the VCO. The VCO of the PLL circuit 20 thus can operate for short periods of time without synchronization by the pilot tone frequency to generate the 57 kHz carrier, upon frequency division in divider 25. This is particularly important if a quartz oscillator 27 is available in the station supply—for example in storage, and is then plugged into terminals **27*a*, and switch-over of the switch 21 is to be delayed for a short period of time until the oscillator 27** has reliably reached its oscillating frequency.

Figure 4:
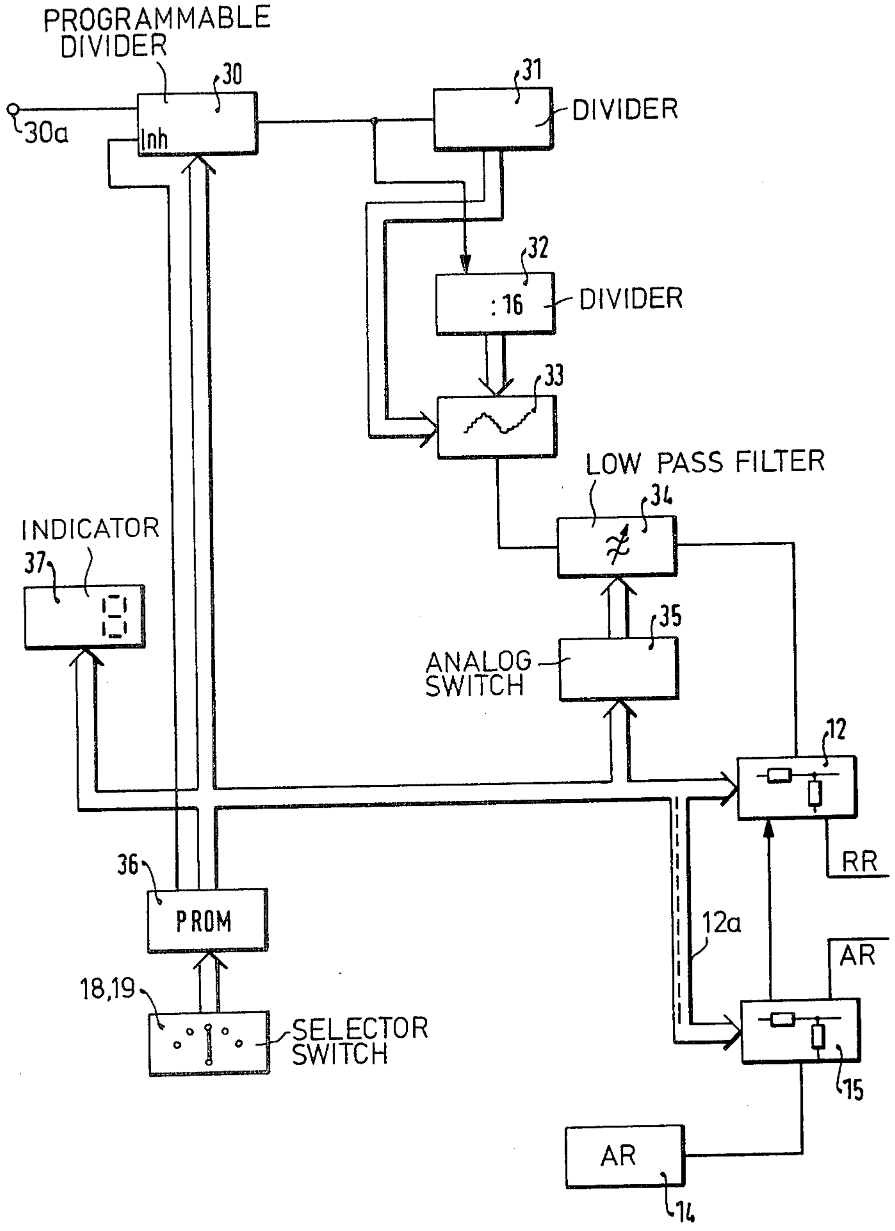
FIG. 4 is a schematic circuit diagram illustrating the generation of the (AR) and (RR) signals utilizing preprogram circuit elements.

The 57 kHz signal at the output of divider 25 is used as the subcarrier. Further, the signal can be frequency-divided to obtain the RR signal, as well as the AR signals. FIG. 4 illustrates systems to generate various frequencies suitable for the AR and RR signal. The system is particularly adapted to generate the RR signal, but a similar, or even an identical circuit can be used to generate the AR signal.

As illustrated in FIG. 4, the 57 kHz signal, after having been generated as shown in FIG. 3, is applied over a wave-shaping stage (not shown) to the pulse input terminal **30*a* of a programmable divider 30. The programmable divider 30** so divides the 57 kHz frequency that the respectively desired RR signal frequency or the AR signal frequency is obtained. The table attached to this specification illustrates how ten RR signals and three AR signals of respective frequencies can be derived from a single 57 kHz input.

The frequency division which is listed in the attached table is merely an example. The particular use of the frequency, and the various divisions, can be determined based on the steepness of the filtering flanks, and filtering effectiveness of filters which are used in receivers to receive the modulated subcarrier.

Referring again to FIG. 4: the programmable divider 30 is connected to a divider 31 which changes the frequency available at the outputs of the programmable divider into a data word. The frequency at the output of the programmable divider is divided also in a second divider 32 by sixteen. A staircase voltage generator 33 is connected to the divider 32 and to the divider 31 to form a sine-shaped signal from the data word derived from divider 31 and the divided signal from divider 32, the sine-shaped signal being of the base frequency.

Details of generating frequencies in this manner are known. See, for example, U.S. Pat. No. 4,083,008; Eschke, to which, in part, corresponds to German published patent application DE-AS No. 25 15 660. The staircase generator 33 is connected to a low-pass filter 34 which has a variable limit or filtering frequency. The output signal of the low-pass filter 34 is connected to a circuit element 12 (FIG. 2), which controls and adjusts the degree of modulation of the 57 kHz signal by amplitude modulation in modulator 17, so that the modulation of the 57 kHz subcarrier is appropriately effected, in accordance with a desired degree of modulation.

The circuit further includes a selector switch 19 which is controlled over a data bus with a programmable read-only memory (PROM) 36. The output line from PROM 36 is connected to a decoder and indicator or display element 37, to the programmable divider 30, and to an analog switch 35. Additionally, the output from PROM 36 is connected to the modulation controllers 12, 15 (see also FIG. 2). A data line additionally is connected from PROM 36 to an inhibit input of the programmable divider 30. A data line further is provided between the analog switch 35 and the low-pass filter 34.

The circuit of FIG. 4 can be constructed identically to generate AR signals, as well as RR signals. The element which controls the function of the respective circuit arrangement is the PROM 36. This PROM 36 can be preprogrammed in accordance with a desired, or established standard, or can be provided as requested by a transmitter station operator. Depending on the position of the selector switch 18,19 different data words are provided by the PROM in accordance with the input command as selected by switch 18,19. These data words are preprogrammed in the PROM. The data words, or sets of data words, will control, for example, the division frequency of the programmable divider 30. Thus, as determined by the selector switch, the PROM 36 will control the specific division ratio of the divider 30 (see the attached Table). A further data word will be applied to the indicator and decoder 37, so that the division, or a particular channel defined by, or characterized by a certain division, will be indicated on the indicator and display.

The PROM further, by simple and routine programming, can provide an output control signal to the modulation controllers 12, 15, in order to determine the degree of modulation if a AR signal, and a RR signal is to be modulated on the auxiliary carrier. This additional control likewise can be obtained in the form of a data word, which, selectively, enable a suitable decoder within the respective modulation controllers 12, 15, to change the resistance values therein and appropriately control the degree of modulation, as desired.

A further output from the PROM 35 is connected to the low-pass filter 34 via the analog switch 35. The analog switch 35 will decode the data word from the PROM 36 and connect respective switching contacts therein to control the elements within the low-pass filter to change its limiting frequencies. For example, if the RR signal is at the lowest frequency, for example at 23.75 Hz, the limit of the low-pass filter 34 is to be selected at the lower level than if a similar system is used for an AR signal of, for example, 178.13 Hz. The low-pass filter 34 can be switched by the same data word which is also used to control the programmable divider 30; for many applications, however, it is sufficient if the low-pass filter 34 is operative in ranges, for example for the RR signals 1 to 6, in a range of from between 23 to 54 Hz, and in a second range from RR signal 7 to 0. The low-pass filter 34 is primarily used to provide a smooth signal, that is, to provide an output signal derived from the staircase generator 33 which, effectively, is a sine wave. If the limit frequencies are too high, harmonics may pass, so that good smoothing cannot be effected. If the limit frequencies are too low, the amplitudes will be too low at high transmission frequencies.

Switch 19 preferably includes a binary/decimal code converter to appropriately control addressing of the memory addresses within the PROM 36. This PROM stores, essentially, the following data in respective data fields:

(a) data to program the programmable divider 30;

(a1) data to program the low-pass filter 34, if programmed in ranges;

(b) data to control the decoder and display 37, to display letters or numerals characterizing selected RR or AR channels;

(c) data to control the degree of modulation of the modulation controllers 12, 15, respectively;

(d) an output applied directly from the PROM 36 to the inhibit input of the programmable divider 30 to lock out modulation of the 57 kHz auxiliary carrier, so that only the carrier will be radiated, and modulation suppressed.

The data can be read out from the PROM 36 in multiplex operation—as well known—utilizing appropriate data buses or ducts which are synchronized, to receive at a suitable time frame, the respective data in the respective receivers. It is, of course, possible to utilize mixed systems, and if the PROM and the dividers, or the indicator-decoder 37, respectively, is based on different technologies, then it is recommended to interpose voltage and peak converters, and/or suitable adapters or conversion apparatus, as well known in data handling technology.

The frequencies illustrated in the Table are merely an example; other frequencies may be used. Frequency change only requires reprogramming of the PROM 36. This is a simple matter well known by current technology. A suitable PROM 36 is SN 74188A, of Texas Instruments.

Selector switch 18,19 permits control of different ranges of data to be commanded by the PROM 36, in accordance with the programming thereof. This, then, permits individual matching of the particular AR and RR frequency to station requirements or government regulations. In accordance with a preferred feature of the invention, the modulator controllers 12, 15 have a plurality of fixed modulation degree settings which can be commanded to be connected by suitable switches therein based on the command data received from the PROM 36. This, then, permits easy maintenance of standards and a degree of modulation of the respective signals, either automatically, or by mere setting of a switch position on selector switch 19. Selector switch 19, itself, can use a plurality of individual switches, rather than a single main selector switch, as illustrated in the schematic representation of FIG. 4. Adjustment of the degree of modulation can then be carried out upon manufacture of the decoder, or of the transmitter; If at the decoder—which will be the preferred setting—mere change of the switch 19 and reading-out the appropriate data from the PROM 36 permits changeover and selection of any desired degree of modulation within the switching setting of the respective controllers 12, 15.

Generation of the auxiliary carrier by a PLL circuit (FIG. 3) is preferred, and especially in a system in which the control signal is phase-shifted by 90° and applied to a phase comparator, customarily present within the PLL circuit, as an inherent component thereof. This permits ready synchronization of the auxiliary 57 kHz carrier with a stereo pilot signal and, further, only minor change in frequency—if any—of the subcarrier if the pilot tone of 19 kHz should fail. Switch 21.21*a*, preferably controlled by a switch controller 26, permits change-over to a local crystal controlled oscillator 27 if the pilot tone should fail—either automatically, or manually. The system, thus, permits versatile use: application in stereo transmitters with additional capability of inherent generation of the auxiliary subcarrier if the cost of the crystal oscillator 27 is warranted, or omission thereof if not; and use of the same coder in monophonic transmitters, in which the quartz oscillator 27 is used, inserted, for example, merely in already available plug-in terminals. In order to prevent interferences or malfunction due to the operation of the quartz oscillator, it is desirable to operate the quartz oscillator only if a 19 kHz pilot tone is not available—that is, if the transmitter is a monophonic transmitter or, if a stereo transmitter and the quartz oscillator 27 is plugged in, only upon malfunction within the transmitter system causing failure of the 19 kHz subcarrier.

Various changes and modifications may be made within the scope of the inventive concept.

TABLE

| Divider 30 Division Ratio | Divided Frequency in Hz | Divider 32, Resulting Frequency in Hz | Signal |
|---|---|---|---|
| 150 | 380.00 | 23.75 | RR 1 |
| 126 | 452.38 | 28.27 | RR 2 |
| 102 | 558.82 | 34.93 | RR 3 |
| 90 | 633.33 | 39.58 | RR 4 |
| 78 | 730.77 | 45.67 | RR 5 |
| 66 | 863.64 | 53.98 | RR 6 |
| 56 | 1017.76 | 63.61 | RR 7 |
| 47 | 1212.77 | 75.80 | RR 8 |
| 36 | 1583.33 | 98.96 | RR 9 |
| 29 | 1965.52 | 122.86 | RR 0 |
| 25 | 2280.00 | 142.50 | AR 1 |
| 23 | 2478.26 | 154.89 | AR 2 |
| 20 | 2850.00 | 178.13 | AR 3 |

We claim:

1. A radio transmission system for transmitting a carrier frequency signal frequency modulated by an information amplitude modulated subcarrier frequency signal, comprising:

first means for supplying a base frequency signal, second means responsive to said first means for generating a subcarrier frequency signal in a non-audible frequency band an amplitude modulator coupled to said second means for amplitude modulating the subcarrier frequency signal with an information signal;

third means responsive to said second means for generating an announcement recognition frequency signal and a radio station recognition frequency signal;

a memory coupled to said third means and having stored therein data representative of (1) the frequency of the announcement recognition frequency signal;

(2) the frequency of the radio station recognition frequency signal;

(3) the degree of amplitude modulation of the subcarrier for the announcement recognition frequency signal, and (4) the degree of amplitude modulation of the subcarrier for the radio station recognition frequency signal;

said memory controlling the third means in accordance with data therein;

means to provide said announcement and radio station recognition frequency signals to said amplitude modulator as said information signal;

selector switch means connected to and selectively controlling the memory to furnish data to the third means and thereby control the third means to amplitude modulate the subcarrier in accordance with selected frequencies and degrees of amplitude modulation; and means to frequency modulate a carrier frequency signal with said amplitude modulated subcarrier.

2. A system according to claim 1, wherein said memory further stores data representative of humanly recognizable indicia.

3. A system according to claim 1, further including controlled connection means connected between the third means and the providing means for controlling the degree of amplitude modulation of the subcarrier by one of said announcement and radio station recognition frequency signals in dependence on the other.

4. A system according to claim 1, wherein said third means includes modulation control means, said memory controlling the modulation control means to control the degree of modulation being effected by said amplitude modulator in accordance with data stored in said memory, and selected for said control by said selector switch means.

5. A system according to claim 1, wherein said third means includes a controllable low-pass filter, said filter being connected to and controlled by said memory to control its filter range in accordance with frequency data stored in the memory.

6. A system according to claim 1, wherein said second means comprises a phase-locked loop including, a phase comparator and means for applying a control signal which is phase-shifted by 90° with respect to the base frequency, to said phase comparator.

7. A system according to claim 6, wherein said means for supplying the 90° phase-shifted signal comprises a 2:1 frequency divider and an exclusive-OR gate coupled to said frequency divider and having applied thereto said base frequency and a base-related frequency, and providing the phase-shifted output signal.

8. A system according to claim 6, wherein said second means further comprises an external quartz oscillator;

and selectively connectable connection means in circuit with said phase-locked loop and coupled to said oscillator to selectively provide an oscillator output to said subcarrier.

9. A system according to claim 8, wherein said second means further includes signal recognition means connected to receive the base frequency, if present, and providing an output signal selectively connecting said external quartz oscillator, if and only if said base frequency should be absent.

* * * * *